R. CHILTON.
METHOD AND APPARATUS FOR FORMING SPRING COUPLINGS.
APPLICATION FILED JULY 20, 1920.

1,379,963.

Patented May 31, 1921.
4 SHEETS—SHEET 1.

Fig.1.

INVENTOR
Roland Chilton
BY
Warren S. Orton.
ATTORNEY

UNITED STATES PATENT OFFICE.

ROLAND CHILTON, OF KEYPORT, NEW JERSEY.

METHOD AND APPARATUS FOR FORMING SPRING-COUPLINGS.

1,379,963.　　　　Specification of Letters Patent.　　Patented May 31, 1921.

Application filed July 20, 1920. Serial No. 397,790.

*To all whom it may concern:*

Be it known that I, ROLAND CHILTON, a subject of the King of Great Britain, and resident of Keyport, in the county of Monmouth and State of New Jersey, have invented certain new and useful Improvements in Methods and Apparatus for Forming Spring-Couplings, of which the following is a specification.

The invention relates in general to an improved method of forming laminated spring structures and specifically relates to a method of forming flexible driving couplings of the type in which a series of laminated spring structures are held in position by cast-on end or hub members, two forms of which coupling are illustrated in my copending applications, Serial No. 289,358, filed April 11, 1919 and Serial No. 384,581, filed May 28, 1920.

The invention also relates to an improved form of instrumentality for practising the method and more definitely defining the apparatus feature of the present disclosure, the invention relates to an improved form of molding or casting machine.

In the above identified application, and referring particularly to the latter of these two prior disclosures as showing a more fully developed device there is illustrated, three sets of laminated spring structures symmetrically disposed at 120° apart about a common axis of reference or rotation, the mid-portions of which structure are of V-shaped form, extend outwardly and radially from said axis of rotation and have their out-turned ends fixedly secured together by means of cast-on hub members.

In the couplings disclosed in the above identified applications and particularly disclosed in the one recently filed each of the laminæ which makes up the spring structures is preformed and then stacked one on the other with the out-turned end portions in close engagement and with the outermost crown portions spaced apart to form the complete spring assemblage. It is required in structures of this character that the laminæ be initially set in slightly spaced apart or other definite relative position and, when assembled into the complete unit, it is required that the spring assemblages occupy a definite, and not infrequently a mathematically exact relation to the common axis of reference or rotation or to some point of reference. In addition to this requirement for exactness in position the problem of manufacturing devices of this character is further complicated by the necessity of accuracy in construction of the parts to insure correspondence of fit between the spring ends and the fixing members thus to avoid local or initial stresses and distortions in clamping or building up the parts. It is appreciated that there is a liability of the springs slipping from their present position during the operation of anchoring the spring ends in their prescribed relative location and this is especially true when the springs are distorted from their normal position when free of the holding means.

Accordingly one of the objects of the invention, when considering the method features of the disclosure, is to provide a simple practical method for forming a laminated spring structure with the elements thereof definitely located. More definitely defined the invention features an improved easily practised method for assembling the laminæ of each of the spring structures into their desired position, for locating the spring structures relative to each other, for securing the end or hub members thereto so as to insure the accurate prescribed disposition both of the laminæ which makes up the spring structures and of the spring structures themselves relative to the end members and which end members will all bear a prescribed normal relative position to each other.

Broadly, I attain this phase of the invention by assembling the laminæ, distorting the same from their normal position if necessary to form the spring structure desired and casting a hub onto the adjacent ends of the pre-located spring structures while holding the opposite or free ends of the structures in definite relation to the formed hub. If the final structure is intended to have hubs on opposite ends the spring structure with its formed hub is reversed in the mold and a second hub is cast on the free ends of the spring structure under conditions as near alike as is physically possible to the conditions which were present during the casting of the first hub. If the hubs at opposite ends are to be of different forms obvious changes are made in the form of the mold to attain this change in form.

Considering the mechanical feature of the disclosure one of the objects of the invention is to provide a simple form of molding or casting machine for molding the spring couplings of the types hereinbefore discussed which will hold the assembled spring structures rigidly in preset locked position during the pouring or molding step of the operation and which will provide for the relocating of the cast-on hub with the spring structures attached thereto in proper position with reference to a point or axis of reference to form the second cast-on end.

Another object of the invention is to provide a molding structure in which the spring locating and locking features may be quickly and positively moved to and from an operative position without interference with the molding features of the structure and in connection with these latter features a still further object is to provide a simple means for replacing different mold elements and moving sectional mold parts to and from an operative position to permit the ready removal of the formed castings.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

In the drawings there is shown one form of the completed article following the showing in application, Serial No. 384,851, and which article includes a pair of axially alined and spaced apart hub members in the form of castings $a$ and $b$ symmetrically disposed with reference to a common axis of reference $x$—$y$ and which may also be a common or mean axis of rotation when the completed article is used as a power shaft coupling. The hubs include alined bores $c$ and $d$, the outer ends of which are enlarged to form recesses $c'$ and $d'$ and out turned attaching flanges $e$ and $f$ defining the outer ends thereof. The hubs are connected resiliently by three sets of laminated spring structures $g$, $h$ and $i$ spaced 120° apart about the axis $x$—$y$ and are each similar in size and construction to the others. Each spring structure includes outwardly extending end members $j$ and $k$ fitted respectively in the hubs $a$ and $b$ and a V-shaped mid-portion 1 which extends radially outward from the axis $a$—$b$. Each spring structure is formed of a stack of thin, wide spring plates $m$ which may have serrated edges to get a "key-in" effect when the metal is run around the spring ends and otherwise the spring resembles the structure all as more fully described in the above identified application.

In the following description and in the claims, parts will be identified by specific names for convenience of expression but they are intended to be as generic in their application to similar parts as the art will permit.

Figure 3:
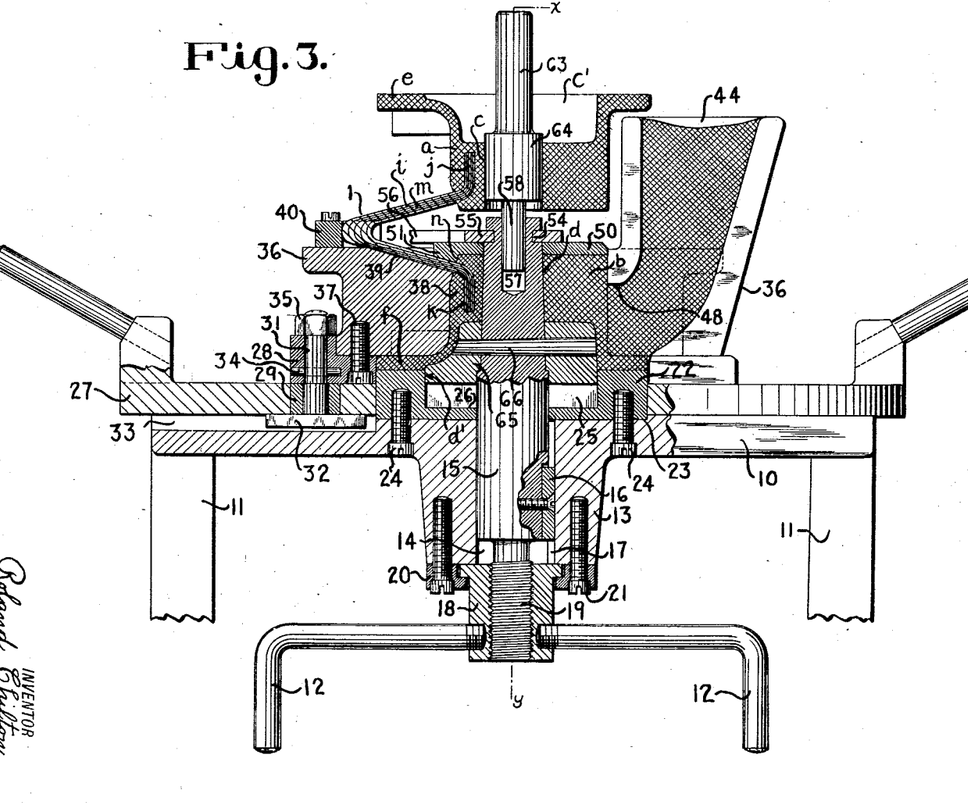
Fig. 3 is a vertical sectional view taken axially of the machine and on the line 3—3 of Fig. 2, and showing in section the conditions of the machine at the conclusion of the operation for casting on the second hub and prior to the removal of the completely formed device from the machine.

In the drawings and referring particularly to the showing in Fig. 3 there is shown a supporting structure including a base 10 carried by legs 11 so disposed as to permit ready access to handles 12 disposed beneath the base and hereinafter more fully described. The base 10 is of massive structure and is provided centrally thereof with a depending hub member 13 provided centrally thereof with a vertically extending draw bolt passageway 14 slidably mounted in which is a draw bolt 15 restrained from rotary movement by a key 16 moving in a key-way 17 formed in the hub. The draw bolt 15 is moved vertically by an advancing screw nut feed, which includes a nut 18 threaded on the lower reduced end 19 of the bolt, the nut being held relative to the hub by means of a ring 20 demountably fastened to the lower end of the hub 13 by bolts 21.

A core guide ring 22 is received in a centrally positioned recess 23 formed on the upper face of the base 10 and is demountably fastened thereto by means of upwardly extending bolts 24. The upper face of the ring 22 is recessed centrally thereof to provide a core receiving space 25 and the bottom wall 26 of the ring defining this space is provided with an opening through which the bolt 15 is passed and which, in effect, constitutes a bolt bearing extension of the passageway 14. The outer periphery of the ring 22 constitutes an internal bearing for a circular cam plate 27 mounted for rotary movement about the axis of the bolt 15 indicated by the line $a$—$b$ in Fig. 3 and herein identified as the axis of reference for the mold as well as the axis of reference for the article formed in the machine.

Figure 1:
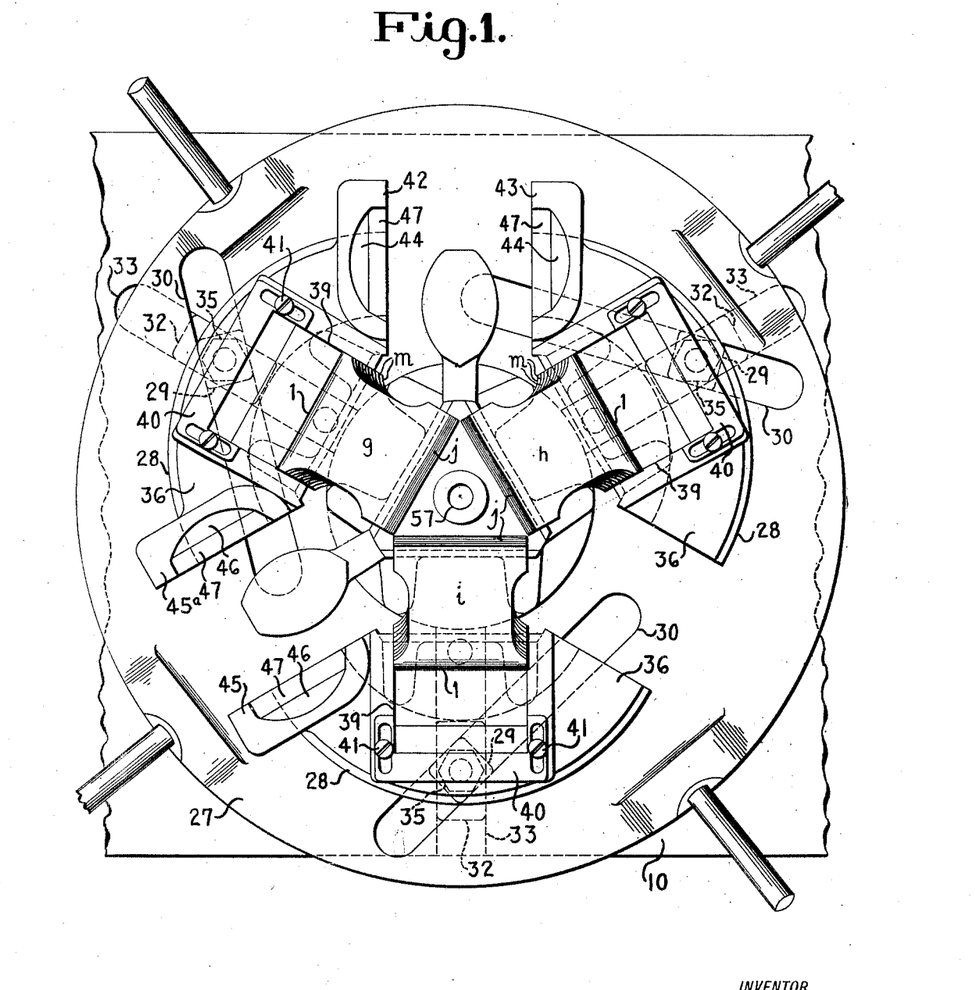
Figure 1 is a plan view looking down upon a molding or casting machine, constituting a preferred embodiment of the apparatus feature of the invention, showing an approved means for economically practising the method features of the disclosure, and showing the mold in open position and with the spring structures disposed in position to receive one of the cast-on ends.
Figure 2:
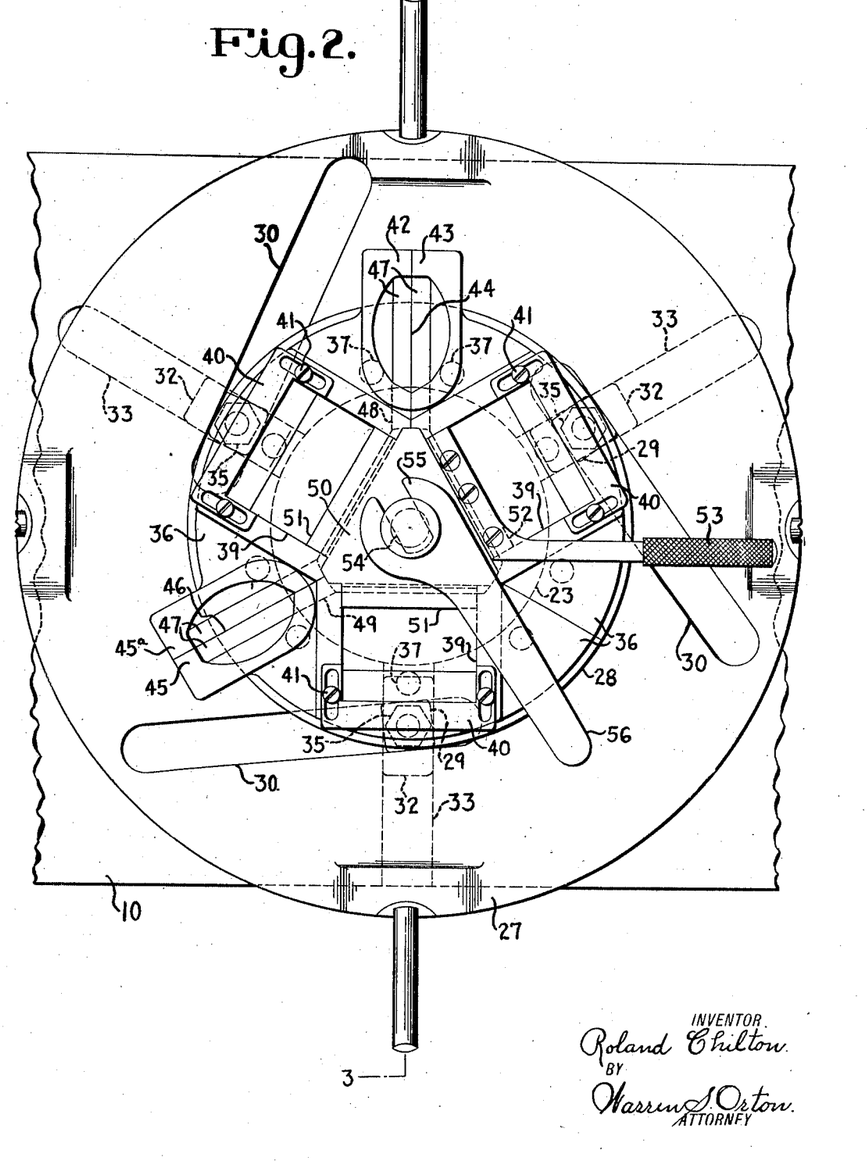
Fig. 2 is a view similar to Fig. 1 showing the mold in its closed position and with the spring structure omitted.

The outlining die forming part of the disclosure is formed of three segments, each movable radially of the axis of reference to and from a closed position and so designed that when in the closed position, as shown in Fig. 2, a closed ring structure is formed about the axis of reference and encircling the molding space of the machine. The segments are similar to each other except for modifications hereinafter disclosed so that the detailed description of any one segment will be sufficient for the others. Each segment includes a die base 28 slidably mounted on the cam plate 27 and operated in its radial movement by a square block 29 which is slidably mounted in an angularly disposed slot 30 formed in the cam plate and free to rotate on an upstanding die section key 31. The lower end of the key is provided with a square head 32, slidably mounted in a radially extending slot 33 formed on the upper face of the base 10. The die base 28 is secured against rotation on the key by means of a pin 34 passed through the key from the outer side of the die base and a nut 35 engages the upper end of the key to secure the parts in the position shown in Fig. 3. A die section 36 is secured to the die base 28 by three circumferentially spaced screws, one of which 37 is shown in Fig. 3. Making the die section separate from the base permits the replacement of the section 36 with other similar sections and thus provides for the formation of different forms of hub members in case the member $a$ be different from member $b$ but with the same diameter to the flanges $e$ and $f$. It is understood that by means of this slot arrangement of the die section and rotating cam plate 27 the rotation of the cam plate anti-clockwise from the position shown in Fig. 2 will move the die-base 28 and the die sections 36 secured thereto radially and into the open position shown in Fig. 1 and that the reverse movement, that is, a clockwise movement from the position shown in Fig. 1 will move the die sections into the closed position shown in Fig. 2.

The die sections 36 are each of massive structure, are 120° in radial extent, with the inner flat face 38 of each section fashioned to form its proportion of the outer side of the hub proper parts of the members $a$ and $b$. The upper edge of each of the die sections 36 is provided with a sloping groove 39 having a width circumferentially to accommodate the width of the spring sections $g$, $h$ and $i$ and is inclined downwardly and inwardly to provide a downwardly inclined seat for opposite sides of the spring section as shown in both Figs. 3 and 4. It is of course obvious that if opposite sides of the V-spring structure is intended to have different inclinations to the axis, the sections 39 must be made up in sets to locate the different sides of the spring structure.

For the purpose of providing an outer abutment to the spring section and to engage and aline the side edges of the laminations $m$, an E-shaped spring locating or abutting block 40 is mounted on the die section adjacent its outer edge and is secured thereto by screw and slot connections 41 so as to permit radial adjustment of this locating block as shown more particularly in Figs. 1 and 2.

The adjacent edges of two of the die sections are provided with upstanding channeled members 42 and 43 which coact to form a pouring gate passageway 44 leading to the hub molding portion of the space outlined by the die segments. Similarly, the die section provided with the upstanding member 42 and another of the sections is provided on adjacent sides with similar upstanding members 45 and 45$^a$ to form a riser passageway 46. The bottom portion of both of the passageways are beveled as shown at 47 so as to permit the ready separation of the formed sprue at the termination of the pouring operation. Passageways 48 and 49 open respectively from the passageways 44 and 46 and lead into the central portion of the die.

Figure 4:
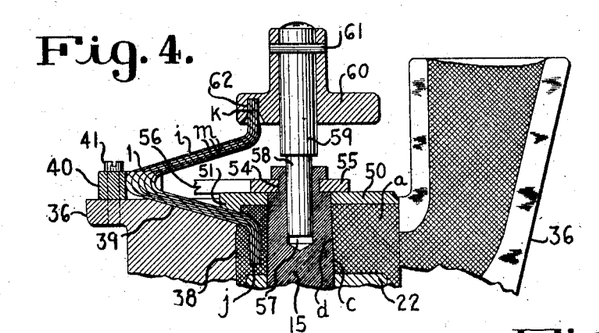
Fig. 4 is a view similar to Fig. 3 showing the upper portion of the machine and with the locating block substituted in place of the formed hub of Fig. 3, the parts being shown at the conclusion of the casting on operation for forming the first hub.
Figures 5, 6, 7, 8:
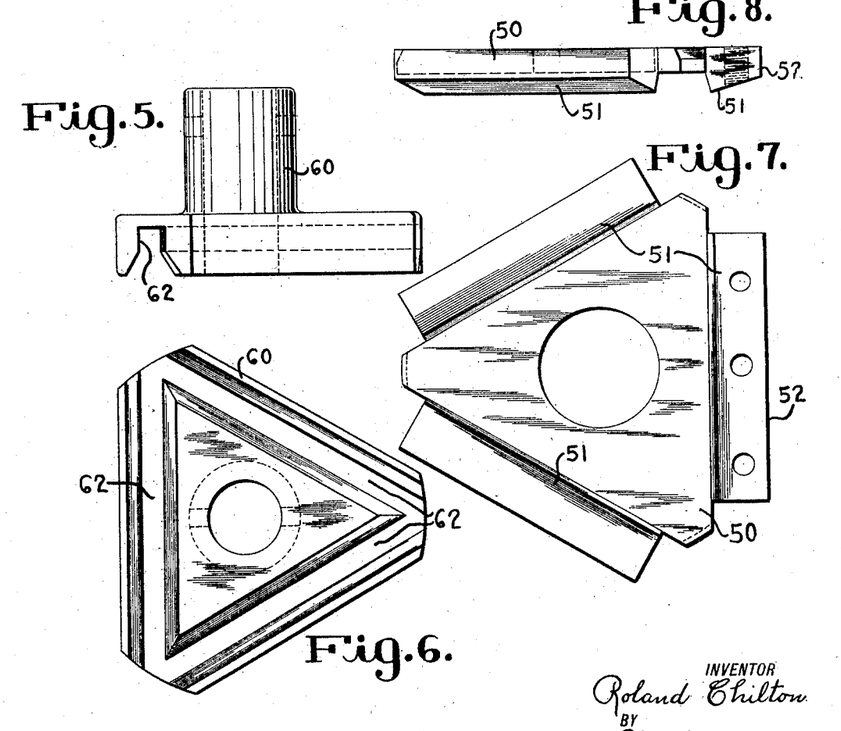
Fig. 5 is an enlarged view in side elevation of the locating block shown in section in Fig. 4.
Fig. 6 is a plan view of the underside of the showing of the locating block in Fig. 5.
Fig. 7 is an enlarged plan view of the top plate shown in Fig. 2 and with the handle omitted.
Fig. 8 is a view in side elevation of the plate shown in Fig. 7.

For the purpose of holding the three spring constructions in position on their groove seats 39, a triangularly formed top plate 50 (see Figs. 7 and 8) is positioned on the upwardly extending portion of the draw bolt. The draw bolt 15 is extended above the normal level of the formed hub $a$ or $b$ as the case may be, but is so proportioned that it will not extend as high as the upper formed hub as shown in Fig. 3. The top plate is provided on the under side of its outlining edges with depending bearing flanges 51 fashioned to fit snugly on top of the spring constructions and designed to bear squarely on the same to clamp the spring laminations between the plate and the die segments as shown in Figs. 3 and 4. In order to permit the plate 50 to be manipulated quickly one of the ledges 52 is provided with an outwardly extending handle 53.

The draw bolt is provided with two slots 54 adjacent its upper end, which slots are engaged by a C washer 55 provided with a handle 56 and is designed to be slipped horizontally into the slots and to bear on the plate 50. It is understood that by this construction the rotation of the nut 18 will cause the draw bolt to move downwardly in the passageway 14 thus drawing the washer firmly into engagement with the top plate 50 which in turn engages the three sets of spring structures to securely clamp the same in position and to clamp the die segments to the base plate.

The upper end of the bolt is provided axially thereof with a pin receiving bore 57 designed to receive the reduced lower end 58 of a locating plug, two forms of which are disclosed. In the showing in Fig. 4 the locating plug 59 is provided with a locating block 60 (see Figs. 5 and 6) secured thereto by a transversely disposed pin 61. The block is provided on its under side with transversely disposed spring receiving slots 62 paralleling the adjacent edges and designed to locate the upper free ends of the three spring structures during the process of casting on the first hub member $a$ on the opposite or lower end as shown in Fig. 4. In the showing in Fig. 3 the locating plug 63 is provided with an enlarged hub engaging portion 64 having a diameter corresponding to the diameter of the portion of the draw bolt which is positioned within the hub member being formed so as to secure the previously formed hub member in axial alinement with the second formed hub and with equal diametered bores $c$ and $d$. A core ring 65 of a shape to form the recesses $c'$ or $d'$ or both is secured to the bolt 15 by a taper pin 66 and is slidably mounted in the guide ring 25 and acts as a stop to limit the downward movement of the bolt in freeing the core ring from the formed casting.

Describing the method feature of the disclosure distinct from any particular form of machine, it will be understood that the laminations $m$ are formed either all alike or in sets of different shapes and the laminations are assembled in the desired stacked relation with the ends $j$ and $k$ in contact. In some forms of construction the V parts of the laminations are crowded one on the other in telescoped relation and the assemblage must be held with the laminations so assembled to prevent them from flying apart. The three sets of laminations so stacked are arranged in longitudinal relation 120° apart and disposed symmetrically about a line of reference. With the stacked and held laminated structures so locked relative to each other, a casting of the desired shape is formed about one of the ends of the assembled organization of spring structures. The organization with the end member cast thereon and holding one end of each spring structure is disposed in proper position and another casting is formed on the opposite end, usually in accurately defined relation to the first formed casting.

Describing the method features of the present disclosure in connection with the operation of the molding machine herein featured, it will be understood that the cam plate is rotated if open from the position shown in Fig. 1 into the position shown in Fig. 2 so as to form the pouring gate and riser passageway. The different laminations of the spring structure are assembled into the three groups or stacks desired and are fitted on the three grooves with the lower free ends of the spring structures extending into the die casting space and with the upper ends of the spring structures disposed in the slots on the under side of the locating block, which locating block is positioned with its pin centered in the bore 57 as shown in Fig. 4.

The plate 50 is positioned on the upper end of the bolt prior to the insertion of the pin 58 in the bore and the washer 55 is inserted in its groove. With the parts in the position shown in either Fig. 3 or 4 the nut 18 is rotated by the manipulation of the handle 12 in a direction to cause the draw bolt to move downwardly and thus clamp the spring structures in set position as previously suggested, and after the device is heated the parts are in position to receive the molten liquid metal poured through the passageway 44. The metal flows down the passageway 44, fills the space horizontally between the die segments and vertically between the same and the ring 22 to form one of the hub members $a$ or $b$ outlined by the die bases 28.

The metal will of course rise in the space between the die segments to contact with the underside of the plate 50 which thus constitutes a top for the die and incidentally forms the angled part N between the spring structures and the hub member featured in the latter of the previously filed applications. When the casting is formed the draw bolt is loosened by re-rotating the handles 12, the washer is free to be withdrawn horizontally and the top plate lifted. The same time the cam plate is re-rotated to bring the sections into the open positions shown in Fig. 1, which thus permits the ready withdrawal of the casting with the spring structure attached thereto. The locating block 59 is discarded and the locking plug 63 is inserted into the previously formed hub member and the parts are replaced in the machine with the now free ends of the springs depending into the molding space and the parts are reassembled as was described for the formation of the first hub. The pouring operation is repeated to form the second hub $b$ and with the die section are again moved into open position to release the completed coupling with its two cast-on hub members. The completed article is removed from the machine, the sprue is cut off and when otherwise machined the article is ready for use.

By means of a device of this character it is possible to rapidly, repeatedly and economically form the peculiarly designed laminated spring structure illustrated with its cast-on hubs and each structure will resemble other succeeding structures as close as is physically possible in the formation of die castings. As the castings formed in the machine at opposite ends of the completed structure are exact counterparts of every other hub so formed all resulting structures will be symmetrically disposed in each completed structure and the hubs will bear a definitely located prescribed relative position. This locating of the hubs relative to each other and to the connecting springs is vitally necessary to the effective use of such devices in those situations where the completed article is designed to constitute a coupling between shafts which are intended normally to rotate about a fixed single axis of rotation corresponding, for instance, to the line $a$—$b$ in the present disclosure.

As the spring structures connecting the cast-on hubs are definitely located relative to each other and relative to a common axis or point of reference, these structures will all have the same relation to the hub members and as the preformed and assembled lamination in each spring structure is held in fixed position in the machine, there necessarily results a uniformity in the resulting products.

The present disclosure features a molding machine capable of rapid actuation and this is a necessary requirement in minimizing cost in factory production. All parts of the resulting casting, with the exception of the top of the pouring gate and riser, are in contact with the die parts and it therefore results that machining of the castings is reduced to a minimum if not entirely eliminated for the sprue can be cut off manually and the resulting roughness filed smooth.

Another advantage of the metal structure over any possible sand or similar mold is that the temper is not withdrawn from the springs by conduction of heat therefrom for the parts are in contact with the hot mold. Care is exercised to provide a good thermal contact between the relatively massive die parts and the springs, which good contact is assured with the clamping device of the disclosure. With the springs in such intimate contact with the die, the temperature of both remains about the same and as a relatively small amount of hot metal is very rapidly chilled on entering the relatively cold and massive die only the ends of the springs that extend a considerable distance in the die matrix have their temperature affected by the hot metal.

While the invention is not limited to the use of any particular casting metal, aluminum has been found admirably adapted for the purpose for which the coupling is designed and this metal is particularly appropriate for uniting the thin steel sheets which make up the lamination disclosed.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim

1. In the art of forming laminated spring structures with a cast-on end part and with parts exteriorly of the cast on end free to move, the method which consists in assembling the laminations in preset relative formation, temporarily holding the laminations together under tension at a plurality of spaced apart points to prevent relative movement of the same during the succeeding operation and casting metal about one end of the held laminations thereby to secure the laminations at said end in fixed preset relation.

2. In the art of forming laminated power transmitting spring structures with cast-on end members, the method of which includes the steps of assembling the laminations in preset relative formation and under tension, temporarily holding the laminations in said formation against their tendency to spring apart by securing one end of the assemblage while leaving the opposite end exposed and forming a casting on said exposed end to anchor the laminations in fixed relative position therein.

3. In the art of forming laminated power transmitting spring structures with cast-on end members, the method which includes the steps of assembling the laminations in preset relative formation, temporarily holding the laminations in said formation by securing one end of the assemblage while leaving the opposite end exposed, forming a casting on said exposed end to anchor the laminations in fixed relative position therein, exposing the opposite, previously secured end and forming a casting on said end thereby to form a built-up spring structure constituting a portable article of manufacture with spring securing castings on opposite ends.

4. In the art of forming a power transmitting organization of spring structures, the method which consists in assembling a plurality of spring plates into a plurality of spring structures, disposing the spring structures in a prefixed relation to each other, temporarily holding the spring plates in their structure and holding the structures in their preset relation to each other, with one end of each structure in juxtaposition to an end of each of the other structures and forming a casting on said juxtaposed ends to permanently secure the structures and to secure the spring plates of each structure in their preset relation.

5. In the art of forming a power transmitting organization of spring structures, the method which consists in assembling a plurality of spring plates into a plurality of spring structures with the spring plates temporarily held in an abnormal position in the structure under tension, disposing the spring structures with their plates so held in abnormal position in a definite relation to each other and forming a casting on said structures thereby to hold the structures in permanently set position with the plates held in the structure under tension.

6. In a machine for casting ends onto laminated spring plate structures, the combination with a segmental die adapted to provide a casting space therein and provided with means for opening the segments relative to each other to provide access to said space, means for securing a laminated spring plate structure with the laminations fixed in position contacting relative to each other and with one end of the secured structure exposed in said space in position to have a member cast thereon, said device provided with a pouring passageway for directing casting metal into said space and about the exposed end of the laminated structure.

7. In a machine for casting ends onto laminated spring plate structures, the combination with a die adapted to provide a casting space therein, means for securing a laminated spring structure with the laminations contacting and fixed in position relative to each other and with one end of the structure exposed in said space in position to have a member cast thereon, said device provided with a pouring passageway for directing casting metal into said space and about the single exposed end of the laminated structure.

8. A casting mold provided with means for forming a casting, of means for locating a laminated spring plate structure with the plates in stacked relation in the mold, and with the stacked ends of the plates extending into said casting forming means, whereby the casting is formed about one end of the stacked spring plate structure.

9. A casting machine provided with means for securing a plurality of spring plate structures therein in a definite relation to each other, means for securing the plates in each structure relative to each other, and means for forming a casting on said located spring structures, said machine including an organization of readily separable die forming members adapted to be moved into position to permit the release of the formed casting and spring members attached thereto and means for separating said members.

10. A casting machine provided with means constituting a part thereof for securing a plurality of separated laminated spring structures therein in a definite relation to each other, and means for forming a casting on said located spring structures.

11. A casting mold for forming a spring structure with cast-on hubs, said mold including means for locating the spring structures with one end in a definite position in the mold, means for casting a hub onto said end of the spring structure and means for locating said cast-on hub on the mold in a defined position to permit another hub to be cast on to the opposite end.

12. A casting mold for forming a spring structure with a cast-on hub, said mold including means for locating a plurality of said spring structures in a definite relation to each other and with an end of each structure in juxtaposition to an end of each of the other structures and means for casting a hub on said juxtaposed ends to secure the same in their preset position.

13. A casting mold for forming a spring structure with cast-on hubs at opposite ends thereof, said mold including means for locating a plurality of said spring structures in a definite relation to each other and with an end of each structure in juxtaposition to an end of each of the other structures, means for casting a hub on said juxtaposed ends to secure the same in their preset position, locating means engaging said cast-on hub for locating the opposite ends of said spring structure in position to have a hub cast on said opposite ends.

14. A casting mold for forming a spring structure with cast-on hubs at opposite ends thereof, said mold including means for locating a plurality of said spring structures in a definite relation to each other and with an end of each structure in juxtaposition to an end of each of the other structures, means for casting a hub on said juxtaposed ends to secure the same in their preset position, locating means for securing the organization, including the spring structures with its cast-on hub in position in the mold to receive a casting on the opposite ends.

15. In a device of the class described, the combination of a base, a manually actuated bolt movable vertically through said base, a die forming member supported on said base and surrounding the portion of the bolt extending above the base to form a casting space, said die forming member provided with a seat adapted to receive a spring structure with a part thereof extending into the die forming member, means carried by the bolt for securing the spring structure to its seat and means for causing molten metal to flow into said member and into the casting space about said extending part of the spring structure.

16. In a device of the class described, the combination of a base, a manually actuated bolt movable vertically through said base, a die forming member supported on said base and surrounding the portion of the bolt extending above the base to form a casting space, said die forming member provided with a seat adapted to receive a spring structure with a part thereof extending into the die forming member, means carried by the bolt for securing the spring structure to its seat and means for causing molten metal to flow into said member and into the casting space about said extending part of the spring structure, said bolt carrying means being readily separable therefrom to permit a quick assembling and demounting of the parts.

17. In a molding machine, the combination of a die provided with a core bolt, said die provided with spring locating means, said bolt provided with means for clamping the spring in position on said spring locating means and means for directing a casting material about a part of the clamped spring.

18. In a casting machine, a die including a die section provided on its upper face with a spring receiving groove, a core bolt provided with means for overlapping the spring and mechanism for advancing the bolt in a direction to cause said means to clamp the spring in position in the groove.

19. In a casting machine, a die including a die section provided on its upper face with a spring receiving groove, a core bolt provided with means for overlapping the spring and mechanism for advancing the bolt in a direction to cause said means to clamp the spring in position in the groove, said die section provided with adjustable spring locating means for resisting any tendency of the spring to move away from the bolt.

20. In a casting machine, a die including a die section provided on its upper face with a spring receiving groove, a core bolt provided with means for overlapping the spring and mechanism for advancing the bolt in a direction to cause said means to clamp the spring in position in the groove and means for moving the die section from an open position to a preset position relative to the bolt thereby to form a casting space therebetween adapted to receive a part of the clamped spring.

21. In a casting machine, a die including a die section provided on its upper face with a spring receiving groove, a core bolt provided with means for overlapping the spring and mechanism for advancing the spring in position in the groove, means for moving the die section from an open position to a preset position relative to the bolt thereby to form a casting space therebetween adapted to receive a part of the clamped spring and means for limiting the closing movement of the section toward the bolt.

22. In a device of the class described, the combination of a die including a die base, a die section demountably secured to said base and adapted to be replaced by a different die section to shape different forms of castings, means for shifting the die base and section from an open to a closed position and coacting to form a molding space in the die, means carried by the die section for locating a spring with an end positioned in said space and means for directing a casting metal about said spring end in the space thereby to form a casting thereon, the shape of which is controlled by the die section used and by the die base.

23. In a mold for casting hubs on spring members, the combination of a sectional mold having an opening, the walls of which form, when the mold is in closed position, a hub mold cavity, a core insertible within said opening to form the bore of the hub and means carried by the hub for locating the spring members relative to bore of the hub.

24. In a mold for casting hubs on spring members, the combination of a sectional mold having an opening, the walls of which form, when the mold is in closed position, a hub mold cavity and a core insertible within said opening to form the bore of the hub, said core provided with a top plate covering said cavity and forming one end of the hub.

25. In a mold for casting hubs on spring members, the combination of a sectional mold having an opening, the walls of which form, when the mold is in closed position, a hub mold cavity and a core insertible within said opening to form the bore of the hub, said core provided with a core ring for forming a recess in the outer end of the hub.

26. In a mold for forming castings on spring members, the combination of a mold having an opening therein, the walls of which form the sides of the casting, a replaceable core ring for forming part of one end of the casting, a removable cover plate for forming the opposite end of the casting and means for securing spring members in position in the mold with an end thereof positioned within the outlines of said wall and between the core ring and cover plate whereby the casting is formed on said spring ends.

27. In a mold for forming castings on spring members, the combination of a mold having an opening therein, the walls of which form the sides of the casting, a replaceable core ring for forming part of one end of the casting, a core guide ring for forming another part of said end, a removable cover plate for forming the opposite end of the casting and means for securing spring members in position in the mold with an end thereof positioned within the outlines of said wall and between the core ring and cover plate whereby the casting is formed on said spring ends.

28. In a mold for forming castings on spring members, the combination of a mold having an opening therein, the walls of which form the sides of the casting, a replaceable core ring for forming part of one end of the casting, a removable cover plate for forming the opposite end of the casting and means for securing spring members in position in the mold with an end thereof positioned within the outlines of said wall and between the core ring and cover plate whereby the casting is formed on said spring ends and means for moving said die into position to permit the ready withdrawal of the casting and its attached spring members.

29. In a mold, the combination of a base, a core guiding ring carried thereby, a core slidably mounted in said ring, said core and ring coacting to form the bottom of the casting, a die base for forming the periphery of a flange on the casting, a die section for forming the top of the flange and the side of the casting, a top plate for forming the top of the casting, a bolt for forming the bore of the casting and for securing the core to the top plate.

30. In a mold, the combination of a base, a cover guiding ring carried thereby, a core slidably mounted in said ring, said core and ring coacting to form the bottom of the casting, a die section for forming the side of the casting, a top plate for forming the top of the casting, a bolt for forming the bore of the casting and for securing the core to the top plate, said die section and top plate coacting to form a clamp for securing preformed members in position to have the casting formed thereon.

31. In a mold, the combination of a base, a cover guiding ring carried thereby, a core slidably mounted in said ring, said core and ring coacting to form the bottom of the casting, a die section for forming the side of the casting, a top plate for forming the top of the casting, a bolt for forming the bore of the casting and for securing the core to the top plate, said die section and top plate coacting to form a clamp for securing preformed members in position to have the casting formed thereon and means controlled by the bolt for moving the clamp to and from an operative position.

32. In a mold for forming different castings on the ends of a plurality of laminated spring members, including a support, means carried on the support for forming a molding cavity, said means being readily replaceable on the support with similar means for forming different outlines to the castings, means for securing the laminations of each spring member in relative position and means for securing the spring members in position to have the casting formed on adjacent ends thereof.

33. In a mold for forming castings on opposite ends of preformed members, the combination of die means provided with a molding cavity, a core extending into the cavity for forming a bore in the castings, means for temporarily locating the preformed member with one end in the cavity to form the bored castings thereon and means for engaging the bore of the first formed casting and coacting with said locating means to locate the opposite end of the preformed member in the cavity thereby to form a second casting on said other end in a definite relation to the first formed casting.

34. In a mold for forming castings on opposite ends of preformed members, the combination of die means provided with a molding cavity, a core extending into the cavity for forming a bore in the castings, means for temporarily locating the preformed member with one end in the cavity to form the bored castings thereon, a plug extending axially from said core and adapted to engage in the bore of the first-formed casting during the formation of a casting on the opposite end of the preformed member whereby the bores of the two castings will be in axial alinement.

35. A mold provided with a molding cavity and having a core extending into said cavity, said core provided with a bore, a plug demountably positioned in said bore and adapted to engage one end of a preformed member and assist in locating the opposite end in said cavity.

36. A mold provided with a molding cavity and having a core extending into said cavity, said core provided with a bore, a plug demountably positioned in said bore and adapted to engage one end of a preformed member and assist in locating the opposite end in said cavity, and means actuated by the core for securing a part of said preformed member in position on the mold.

37. A mold provided with a molding cavity, means for engaging a laminated spring member intermediate its ends for securing the laminations in fixed position and for securing the member as a whole in position with one end extending into said cavity, and means for engaging the opposite end adapted to locate the same in definite position relative to the casting formed on the end in the cavity.

38. A mold for forming successively two similar castings on opposite ends of a laminated spring member, said mold provided with a molding cavity, means for engaging the spring member intermediate its ends for securing the laminations in fixed position and with one end of each lamination in the cavity while the castings are being formed on the ends and means engaging the ends of the laminations exteriorly of the cavity for locating the member relative to the castings formed thereon.

39. In a molding machine, the combination of means for forming a molding cavity, a bolt constituting a core extending through said cavity, one end of the bolt provided with a plug locating means, a plug carried by said means and adapted to engage a member provided with extensions disposed in said cavity whereby a casting can be formed on said extension in preset relation to said engaged member.

40. In a molding machine, the combination of means for forming a molding cavity, a bolt constituting a core extending through said cavity, one end of the bolt provided with a plug locating means, a plug carried by said means and adapted to engage a member provided with extensions disposed in said cavity whereby a casting can be formed on said extension in preset relation to said engaged member and clamping means for engaging said extension in spaced relation to the ends in the cavity for locating the same in place in the machine during the casting operation.

41. In a molding machine, the combination of means for forming a molding cavity, a bolt constituting a core extending through said cavity, means for advancing the bolt in said cavity, means providing a spring seat adapted to locate a spring with one end in said cavity, and means carried by the bolt for clamping the spring to said seat.

42. In a molding machine, the combination of means for forming a molding cavity, a bolt constituting a core extending through said cavity, means for advancing the bolt in said cavity, means providing a spring seat adapted to locate a spring with one end in said cavity, means carried by the bolt for clamping the spring to said seat, and a core carried by said bolt and movable therewith from the formed casing in the cavity to permit the release of the same.

43. In a mold, the combination of means forming a mold cavity, a spring seat formed on said means and adapted to position a spring with an end in the cavity, a bolt movable in said cavity and constituting a core, a top plate loose on said bolt defining the top of the cavity and adapted to engage the spring on said seat, a washer carried by the bolt and adapted to bear on the top plate to cause the same to clamp the spring to its seat.

44. In a mold, the combination of means forming a mold cavity, a spring seat formed on said means and adapted to position a spring with an end in the cavity, a bolt movable in said cavity and constituting a core, a top plate loose on said bolt defining the top of the cavity and adapted to engage the spring on said seat, said bolt provided above the top plate with a cut slot, a manually actuated washer adapted to be inserted in said slot and means for drawing the bolt to cause the washer to bear on the top plate and thus force the same into holding engagement with the spring on the seat.

45. In a mold, the combination of means forming a mold cavity, a spring seat formed on said means and adapted to position a spring with an end in the cavity, a bolt movable in said cavity and constituting a core, a top plate loose on said bolt defining the top of the cavity and adapted to engage the spring on said seat, said bolt provided above the top plate with a cut slot, a manually actuated washer adapted to be inserted in said slot, means for drawing the bolt to cause the washer to bear on the top plate and thus force the same into holding engagement with the spring on the seat and means for preventing rotary movement of the bolt about its axis as it is advanced into its spring holding position.

46. In a mold, the combination of means forming a mold cavity, a spring seat formed on said means and adapted to position a spring with an end in the cavity, a bolt movable in said cavity and constituting a core, a top plate loose on said bolt defining the top of the cavity and adapted to engage the spring on said seat, a washer carried by the bolt and adapted to bear on the top plate to cause the same to clamp the spring to its seat and a replaceable core carried by the bolt for forming a side of the casting opposite the top plate.

47. In a mold, the combination of means forming a mold cavity, a spring seat formed on said means and adapted to position a spring with an end in the cavity, a bolt movable in said cavity and constituting a core, a locating block carried by the bolt and adapted to engage the ends of the spring opposite the end disposed in the cavity.

48. A machine for casting ends onto a spring, the combination of means for forming a molding cavity, a core positioned in said cavity to form a bore in the castings, means for positioning a spring in the machine with one end in the cavity and another end extending from the cavity and locating means carried by the core for engaging the exposed end of the spring.

49. A machine for casting ends onto a spring, the combination of means for forming a molding cavity, a core positioned in said cavity to form a bore in the castings, means for positioning a spring in the machine with one end in the cavity and another end extending from the cavity, said core provided with means for receiving one of a plurality of locating means for disposing the exposed end of the spring in preset position relative to the casting formed on the end in the cavity.

50. A machine for casting ends onto a spring, the combination of means for forming a molding cavity, a core positioned in said cavity to form a bore in the castings, means for positioning a spring in the machine with one end in the cavity and another end extending from the cavity, and a plug carried by the core and having a diameter adapted to engage in a bore previously formed by said core.

Signed at Keyport in the county of Monmouth and State of New Jersey this 12th day of July, A. D. 1920.

ROLAND CHILTON.